Jan. 23, 1962  J. F. MILLAR ETAL  3,018,221
PENICILLIN-SULFONAMIDE TABLET
Filed March 28, 1958
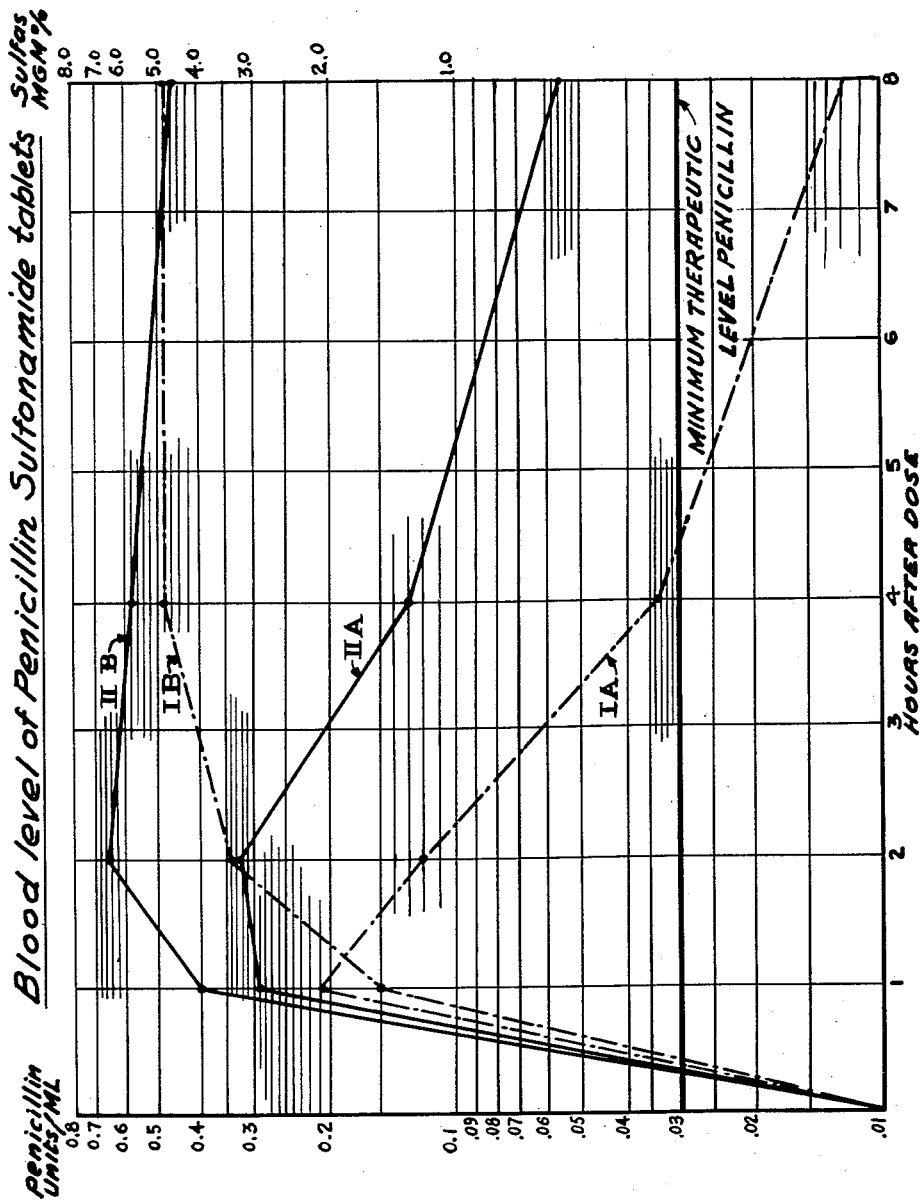
Inventors
JOHN F. MILLAR
GERHARD LINDNER
By Cushman, Darby & Cushman
Attorneys

United States Patent Office 3,018,221
Patented Jan. 23, 1962

3,018,221
PENICILLIN-SULFONAMIDE TABLET
John F. Millar, Valois, Quebec, and Gerhard Lindner, Montreal, Quebec, Canada, assignors to Charles E. Frosst & Co., Montreal, Quebec, Canada, a corporation of Canada
Filed Mar. 28, 1958, Ser. No. 724,764
12 Claims. (Cl. 167—65)

The present invention relates to a penicillin-sulfonamide tablet which is capable of providing therapeutic blood levels of the antibiotic and sulfonamide for an equivalent but prolonged period of time.

The therapeutic value of concurrent administration of antibiotic and sulfonamide drugs has been well established in medical practice. Such combined therapy provides a broad spectrum of activity against pathogenic organisms and in many bacterial infections, a synergistic action.

One of the most effective and widely used combinations is a penicillin salt with one or more sulfonamides. This mixture has been found highly effective in the treatment of diseases such as pneumonia, meningitis, septicemia gonorrhea, scarlet fever and hemolytic streptococcic infections. The combination is effective when administered orally and is commonly prepared as a compressed tablet.

One of the problems in the use of this combination, as prepared by present methods known in the art, is the fact that the rate of absorption and elimination of penicillin is very much higher than that of sulfonamides. For example, when a dosage of 2 gm. of sulfonamides is given simultaneously with 500,000 units of potassium penicillin, the sulfonamides are slowly absorbed over a period of about two hours and provide a therapeutic blood level for approximately 8 hours. The penicillin is absorbed within 30 minutes and provides a therapeutic blood level for a period of only 4 to 5 hours. Thus, there is no simultaneous therapeutic blood level of penicillin during the final three hour period of the therapeutic level of sulfonamides. To ensure concurrent therapeutic blood levels, it is therefore necessary to repeat the dosage at intervals of not more than four hours.

The following are examples of available methods for preparing penicillin-sulfonamide tablets having prolonged therapeutic action. In one method, a penicillin-sulfonamide tablet can be coated with an enteric coating material by pan coating and a further layer of the penicillin-sulfonamide mixture is pan-coated over the enteric layer. Among disadvantages of this procedure are the prolonged time required for its completion and the difficulty of obtaining a uniform amount of medicament in the outer layer of each tablet. Another disadvantage is the necessity of using coating compositions which are essentially anhydrous. Such a procedure is illustrated in U.S.P. 2,798,024, J. R. Zapapas et al., July 2, 1957, wherein erythromycin is used instead of penicillin.

A further method that is available, is to provide a press coated tablet wherein an enteric layer is press-coated between the inner core and the outer compressed layer in accordance with the procedure disclosed in U.S.P. 2,757,124, S. E. Wolff, July 31, 1956. This double coating procedure would produce tablets of excessive size, in relation to the amount of medicament, in the case of a penicillin-sulfonamide tablet.

The main objective of the present invention is to provide an oral dosage form of combined penicillin and sulfonamide in which penicillin release is controlled such that a therapeutically effective blood level is maintained over the same period as that of the sulfonamide. Thus the frequency of dosage can be reduced without the danger of having an ineffective blood level of penicillin at any time between doses.

A secondary objective is to increase the efficiency of oral penicillin medication, by protecting the major portion of the dose administered from destruction by gastric acid during passage through the stomach, by the use of a non-enteric material which will precipitate in the presence of the gastric acid.

In accordance with the present invention, there is now provided a tablet which, after ingestion, will rapidly make available one portion of penicillin and sulfonamide in the stomach and will slowly release another portion of penicillin and sulfonamide in the intestinal tract. The novel tablet of the present invention comprises a core of a granular mixture made up of the major amount of total a penicillin salt and a minor amount of the total sulfonamide to be administered and ammoniated polyvinyl acetate phthalate, and a concentric compressed shell layer, over said core, made up of a minor amount of the total penicillin salt and a major amount of the total sulfonamide. The tablet of the present invention is such that it will provide a sustained therapeutic blood level of both the penicillin and sulfonamide for a period of about eight hours.

When the complete tablet is ingested, the shell layer disintegrates and releases its content of both drugs in the stomach, thus making available for early absorption, the major portion of sulfonamides and a minor portion of the penicillin salt. The remaining core does not disintegrate in the stomach due to the precipitation by acid of polyvinyl acetate phthalate which forms a relatively impermeable and acid-insoluble layer on the surface of the core.

As the core progresses through the intestinal tract into a zone of higher pH, the precipitated polyvinyl acetate phthalate forms a soluble salt which is leached out and the tablet then begins to disintegrate and slowly releases the remainder of the sulfonamides and the major portion of the penicillin salt. The controlled release of penicillin salt obtained in this manner provides a blood level above the minimum therapeutic level for a period of at least eight hours.

The following tables and FIGURE I show the difference between a conventional tablet and a tablet of the present invention in terms of the blood levels of sulfonamides and penicillin salt obtained on the administration of the drugs in the two dosage forms. Table I shows the blood levels of human subjects obtained from a dosage of four conventional tablets containing a total of 440,000 units of potassium penicillin G and 2 gm. of mixed sulfonamides.

TABLE I

A—UNITS OF PENICILLIN PER ML. OF BLOOD SERUM

| Subject | Hours After Administration | | | |
|---|---|---|---|---|
| | 1 | 2 | 4 | 8 |
| A | 0.32 | 0.26 | 0.05 | 0.022 |
| B | 0.16 | 0.08 | 0.03 | 0.024 |
| C | 0.017 | 0.054 | | 0.017 |
| D | 0.34 | 0.17 | 0.066 | 0.015 |
| E | 0.135 | 0.062 | 0.018 | |
| H | 0.15 | 0.13 | 0.042 | |
| I | 0.36 | 0.13 | 0.031 | 0.017 |
| K | 0.096 | 0.09 | | |
| L | 0.27 | 0.086 | 0.038 | |
| M | 0.32 | 0.15 | 0.058 | 0.029 |
| Average | 0.21 | 0.12 | 0.033 | 0.012 |
| Percent above minimum therapeutic level (0.03 units/ml.) | 100 | 100 | 40 | 0 |

TABLE I—Continued

B—MG. SULFONAMIDES PER 100 ML. OF BLOOD SERUM

| Subject | Hours After Administration | | | |
|---|---|---|---|---|
| | 1 | 2 | 4 | 8 |
| A | 1.9 | 4.8 | 7.8 | 3.6 |
| B | 3.3 | 5.5 | 6.8 | 5.7 |
| C | | | 1.2 | 3.3 | 4.5 |
| D | 1.5 | 3.6 | 3.9 | 3.5 |
| E | 1.9 | 3.6 | 4.9 | 5.5 |
| H | 1.0 | 1.9 | 3.2 | 3.3 |
| I | 1.8 | 3.8 | 3.9 | 3.8 |
| K | 0.9 | 4.1 | 5.8 | 6.5 |
| L | | | 5.1 | 5.7 | 4.7 |
| M | 2.7 | | 4.1 | 4.2 |
| Average | 1.5 | 3.4 | 4.9 | 4.9 |

Table II shows the blood levels obtained from a dosage of four tablets of the present invention containing a total of 500,000 units of potassium penicillin G and 2 gm. of sulfonamides.

TABLE II

A—UNITS OF PENICILLIN PER ML. OF BLOOD SERUM

| Subject | Hours After Administration | | | |
|---|---|---|---|---|
| | 1 | 2 | 4 | 8 |
| A | 0.21 | 0.60 | 0.165 | |
| B | 0.105 | 0.18 | 0.045 | 0.054 |
| C | 0.50 | 0.64 | 0.14 | 0.032 |
| D | 0.46 | 0.27 | 0.15 | |
| F | 0.23 | 0.42 | 0.13 | 0.032 |
| H | 0.26 | 0.27 | 0.135 | 0.115 |
| I | 0.30 | 0.165 | 0.145 | 0.038 |
| K | 0.27 | 0.52 | 0.20 | 0.105 |
| M | 0.125 | 0.15 | 0.10 | 0.09 |
| O | 0.46 | 0.26 | 0.105 | 0.10 |
| Average | 0.29 | 0.32 | 0.13 | 0.056 |
| Percent above minimum therapeutic level (0.03 units/ml.) | 100 | 100 | 100 | 80 |

B—MG. SULFONAMIDES PER 100 ML. BLOOD SERUM

| Subject | Hours After Administration | | | |
|---|---|---|---|---|
| | 1 | 2 | 4 | 8 |
| A | 4.1 | 7.1 | 5.3 | 4.2 |
| B | 2.7 | 4.2 | 4.3 | 4.0 |
| C | 3.6 | 6.6 | 4.1 | 2.9 |
| D | 4.5 | 4.6 | 3.7 | 2.8 |
| F | 3.5 | 9.7 | 6.7 | 4.3 |
| H | 3.4 | 4.5 | 4.5 | 3.9 |
| I | 3.6 | 5.6 | 5.0 | 4.1 |
| K | 4.6 | 8.0 | 8.1 | 6.6 |
| M | 3.5 | 6.6 | 7.6 | 7.2 |
| O | 6.7 | 8.4 | 7.6 | 5.7 |
| Average | 4.0 | 6.5 | 5.8 | 4.6 |

The comparison of the penicillin and sulfonamide data of Tables I and II will be more fully understood by referring to FIGURE I of the drawings, wherein curves IA and IB represent the data of Table I and curves 2A and 2B represent the data of Table II.

On comparing the penicillin data in these tables, it may be seen that with the conventional tablets, only 40% of the subjects had a therapeutic blood level of penicillin at 6 hours and none at 8 hours after administration, while with the tablets of the present invention, 100% of subjects had a therapeutic blood level at 6 hours and 80% at 8 hours after administration.

A comparison of the sulfonamide data shows that there was no decrease but on the contrary it would appear that there is an enhancement of blood levels with the tablets of the present invention.

The penicillin which may be used in accordance with the present invention may comprise, penicillin salts, for example the potassium, sodium, ammonium or calcium salts of penicillin G or V, or free penicillin V.

The term "sulfonamide" when used throughout the specification and claims is intended to cover therapeutically active derivatives of para-amino benzene sulfonamide which are substantially water-insoluble. As an example of suitable sulfonamides, there may be mentioned sulfathiazole, sulfapyridine, sulfadiazine, sulfamerazine, sulfamethazine, sulfanilamide, sulfaguanidine, sulfacetamide, sulfasoxazole and sulfadimethine and mixtures thereof.

In selecting the amounts of drugs to be used, the limiting factors are the desired dosage of sulfonamide and the practical size of the completed tablet for oral administration. Thus as sulfonamides are commonly used in doses of 0.5 gm. or multiples thereof, a convenient total dose per tablet is 0.5 gm. of sulfonamide together with an amount of penicillin which will provide a therapeutic blood level, usually at least 25,000 units.

A preferred combination is 0.5 gm. of sulfonamide together with 125,000 units of penicillin. These are distributed so that 0.4 gm. of sulfonamide and 25,000 units of penicillin are in the shell and 0.1 gm. of sulfonamide and 100,000 units of penicillin are in the core. This forms a complete tablet which can be easily swallowed.

The core

In preparing the tablet of the present invention, the core is obtained by compression on a tablet machine of granules containing an intimate mixture of a penicillin salt, at least one therapeutically useful sulfonamide drug, ammoniated polyvinyl acetate phthalate and suitable inert excipients and lubricants.

The core contains from 60–95° by weight of the total penicillin and from 10–35% by weight of the total sulfonamide, and the amount of sulfonamide is from 0.5 to 5 parts by weight of the amount of penicillin in the core. In terms of international units, there can be used from 25,000 to 250,000 I.U., with the preferred amount being about 100,00 I.U.

Ammoniated polyvinyl acetate phthalate is prepared by partial neutralization of polyvinyl acetate phthalate having a degree of polymerization of from 60–800 and an acetyl content of from 4 to 15% and a phthalyl content of from 40 to 70%. The amount used is based on the total weight of the core ingredients and can be from 5% to 20%. The preferred level is 8 to 10% of the total weight of the core.

The shell

The concentric shell is applied around the core tablet by compression on a machine as described in U.S. Patents 2,700,938 and 2,727,473. The granules comprising the shell before compression, consist of an intimate mixture of at least one substantially water-insoluble sulfonamide drug and penicillin, and suitable binders, excipients and lubricants. The amount of sulfonamide used in the shell is a major portion of the total sulfonamide.

The amount of penicillin used is a minor portion of the total dose per tablet and is in the range of 5 to 40% preferably about 20% of the total penicillin.

EXAMPLES

The present invention will be more fully understood by referring to the following examples which are given to illustrate the preparation of the penicillin-sulfonamide tablets of the present invention.

Example I

PREPARATION OF AMMONIATED POLYVINYL ACETATE PHTHALATE

| | Gm. |
|---|---|
| Polyvinylacetate phthalate | 400 |
| 28% ammonia solution—approximately | 90 |
| Denatured alcohol (SDAG–1G, to make 1000 ml. | |

80 gm. of ammonia solution is mixed with 500 ml. of denatured alcohol and the polyvinyl acetate phthalate is slowly added with continuous mechanical stirring.

When the resin is completely dissolved, the pH of the solution is checked and adjusted to pH 6.7 with additional 28% ammonia solution.

The solution is then made up to a total volume of 1000 ml. with additional denatured alcohol.

This solution contains about 40% w./v. ammoniated polyvinyl acetate phthalate and is used as such in the preparation of the core tablets of the present invention.

The starting polyvinyl acetate phthalate is characterized by a degree of polymerization of about 750, an acetyl content of about 4.8% and a phthalyl content of about 65%.

*Example II*

PREPARATION OF CORE TABLETS

| | Gm. |
|---|---|
| Potassium penicillin G (1595 units/mgm.) | 6270 |
| Sulfadiazine U.S.P. | 2700 |
| Sulfamerazine U.S.P. | 2700 |
| Sulfamethazine U.S.P. | 2700 |
| Corn starch | 900 |

The above powders are intimately blended and then mixed with 3.5 litres of 40% w./v. solution of ammoniated polyvinyl acetate phthalate prepared as in Example I. The moistened mass is formed into granules by standard methods used in the art and then placed in a warm air dryer to remove volatiles.

The dried granules are forced through a 16 mesh sieve and then blended with 200 gm. of finely powdered magnesium stearate.

The completed granulation is then compressed into tablets using standard concave punches with a diameter of 5/16″. Each tablet weighs about 170 mgm. and a yield of approximately 100,000 tablets is obtained.

PREPARATION OF SHELL GRANULATION

| | Gm. |
|---|---|
| Potassium penicillin G (1595 units/mgm.) | 1,570 |
| Sulfadiazine U.S.P | 14,000 |
| Sulfamerazine U.S.P | 14,000 |
| Sulfamethazine U.S.P | 14,000 |
| Corn starch | 3,000 |
| Sodium carboxymethyl cellulose (high viscosity) | 500 |

The above powders are intimately blended and then mixed with 15 litres of a solution containing 4500 gm. of polyvinyl pyrrolidone dissolved in denatured alcohol. The moistened mass is formed into granules by standard methods used in the art and the granules dried at 40° C. to remove alcohol.

The dried granules are forced through a 20 mesh sieve and then blended with 400 gm. of magnesium stearate.

PREPARATION OF COMPLETE TABLET

The core tablets and the shell granulation are processed in a Stokes press-coating tablet machine to form about 100,000 concentric tablets of 15/32″ diameter, each weighing approximately 690 mgm.

Each tablet contains in the shell layer, about 25,000 units of potassium penicillin G and 420 mgm. of mixed sulfonamides and, in the core, about 100,000 units of potassium penicillin G and 80 mgm. of mixed sulfonamides.

All stages of the processing are carried out under conditions of low relative humidity to minimize the uptake of moisture which is detrimental to penicillin stability.

*Example III*

PREPARATION OF CORE TABLETS

| | | |
|---|---|---|
| Sodium penicillin G (1667 units/mgm.) | gm. | 180 |
| Corn starch | gm. | 60 |
| Sulfadiazine U.S.P | gm. | 267 |
| Sulfamerazine U.S.P | gm. | 267 |
| Sulfathiazole U.S.P. | gm. | 267 |
| Ammoniated polyvinyl acetate phthalate (40% w./v. solution) | ml. | 240 |
| Magnesium stearate | gm. | 14 |

The above materials are processed as in Example II. The completed granulation is compressed into tablets with a diameter of 1/4″, each tablet weighing about 115 mgm. A yield of approximately 10,000 tablets is obtained.

PREPARATION OF SHELL GRANULATION

| | Gm. |
|---|---|
| Sodium penicillin G (1667 units/mgm.) | 120 |
| Sulfadiazine U.S.P | 566 |
| Sulfamerazine U.S.P | 566 |
| Sulfathiazole U.S.P | 566 |
| Corn starch | 190 |
| Sodium carboxymethyl cellulose (high viscosity type) | 33 |
| Calcium citrate | 900 |
| Magnesium stearate | 27 |

The above materials are processed as in Example II using as a binder 280 gm. of polyvinyl pyrrolidone dissolved in 700 ml. of denatured alcohol.

PREPARATION OF COMPLETE TABLET

The core tablets and the shell granulation are compressed in a Stokes press-coating tablet machine to form about 10,000 concentric tablets of 7/16″ diameter, each weighing approximately 440 mgm.

Each tablet contains in the shell layer, about 20,000 units of sodium penicillin G and 170 mgm. of sulfonamides and in the core about 30,000 units of sodium penicillin G and 80 mgm. of sulfonamides.

*Example IV*

PREPARATION OF CORE TABLETS

| | | |
|---|---|---|
| Potassium penicillin V (1530 units/mgm.) | gm. | 980 |
| Sulfadiazine U.S.P | gm. | 700 |
| Corn starch | gm. | 100 |
| Ammoniated polyvinyl acetate phthalate (40% w./v. solution) | ml. | 440 |
| Magnesium stearate | gm. | 25 |

The materials are processed as in Example II. The completed granulation is compressed into tablets with a diameter of 11/32″, each weighing about 198 mgm.

A yield of about 10,000 tablets is obtained.

PREPARATION OF SHELL GRANULATION

| | Gm. |
|---|---|
| Potassium penicillin V (1530 units/mgm.) | 330 |
| Sulfadiazine U.S.P. | 4,300 |
| Corn starch | 320 |
| Sodium carboxymethyl cellulose (high viscosity type) | 55 |
| Magnesium stearate | 45 |

The above materials are processed as in Example II using as a binder 480 gm. of polyvinyl pyrrolidone dissolved in 1200 ml. of denatured alcohol.

PREPARATION OF COMPLETE TABLET

The core tablets and shell granulation are compressed in a Stokes press-coating tablet machine to form about 10,000 concentric tablets, each of 1/2″ in diameter and weighing approximately 750 mgm.

Each tablet contains in the shell layer, about 50,000 units of potassium penicillin V and 430 mgm. of sulfadiazine and in the core about 150,000 units of potassium penicillin V and 70 mgm. of sulfadiazine.

We claim:
1. A penicillin-sulfonamide tablet consisting of a core tablet consisting of compressed granules of penicillin, at least one substantially water-insoluble sulfonamide drug and ammoniated polyvinyl acetate phthalate, and a compressed concentric shell consisting essentially of a granular mixture of penicillin and at least one substantially water-insoluble sulfonamide drug.

2. A penicillin-sulfonamide tablet consisting of a core tablet consisting of compressed granules of penicillin, at least one substantially water-insoluble sulfonamide drug and ammoniated polyvinyl acetate phthalate, and a compressed concentric shell consisting essentially of a granular mixture of penicillin and at least one substantially water-insoluble sulfonamide drug, the amount of penicillin in the core tablet comprising a major portion of the total amount of penicillin in the entire tablet and the amount of sulfonamide drug in the core tablet comprising a minor amount of the total sulfonamide drug in the entire tablet.

3. A penicillin-sulfonamide tablet consisting of a core tablet consisting of compressed granules comprising from 60 to 95% by weight of the total amount of penicillin, at least one substantially water-insoluble sulfonamide drug in an amount of from 10 to 35% by weight of the total sulfonamide drug, and ammoniated polyvinyl acetate phthalate and a compressed concentric shell consisting essentially of a granular mixture comprising of from 5 to 40% by weight of the total penicillin and from 65 to 90% by weight of the total sulfonamide drug.

4. A penicillin-sulfonamide tablet consisting of a core tablet consisting of compressed granules of penicillin, at least one substantially water-insoluble sulfonamide drug and ammoniated polyvinyl acetate phthalate, and a compressed concentric shell consisting essentially of a granular mixture of penicillin and at least one substantially water-insoluble sulfonamide drug, the amount of penicillin in the core tablet being from 60 to 95% by weight of the total penicillin, the amount of sulfonamide in the core tablet being from 10 to 35% by weight of the total sulfonamide and the sulfonamide in the core constituting from 0.5 to 5 parts by weight of the amount of penicillin in the core.

5. A penicillin-sulfonamide tablet consisting of a core tablet consisting of compressed granules of penicillin, at least one substantially water-insoluble sulfonamide drug and amomniated polyvinyl acetate phthalate, and a compressed concentric shell consisting essentially of a granular mixture of penicillin and at least one substantially water-insoluble sulfonamide drug, the amount of penicillin in the core tablet being from 60 to 95% by weight of the total penicillin, the amount of sulfonamide in the core tablet being from 10 to 35% by weight of the total sulfonamide and the sulfonamide in the core tablet constituting from 0.5 to 5 parts by weight of the amount of penicillin in the core, and the ammoniated polyvinyl acetate phthalate being from 5 to 20% by weight of the core tablet.

6. A penicillin-sulfonamide tablet consisting of a core tablet consisting of compressed granules of penicillin, at least one substantially water-insoluble sulfonamide drug and ammoniated polyvinyl acetate phthalate, and a compressed concentric shell consisting essentially of a granular mixture of penicillin and at least one substantially water-insoluble sulfonamide drug, the amount of penicillin in the core tablet being from 60 to 95% by weight of the total penicillin, the amount of sulfonamide in the core tablet being from 10 to 35% by weight of the total sulfonamide and the sulfonamide in the core tablet constituting from 0.5 to 5 parts by weight of the amount of penicillin in the core tablet, and the ammoniated polyvinyl acetate phthalate being from 5 to 20% by weight of the core tablet, the ammoniated polyvinyl acetate phthalate being characterized by a degree of polymerization of from 600 to 800, an acetyl content of from 4 to 15% and a phthalyl content of from 40 to 70%.

7. A penicillin-sulfonamide tablet consisting of a core tablet consisting of compressed granules of a water-soluble penicillin, at least one substantially water-insoluble sulfonamide drug and ammoniated polyvinyl acetate phthalate, and a compressed, concentric shell consisting essentially of a granular mixture of a water-soluble penicillin and at least one water-insoluble sulfonamide drug, the amount of penicillin in the core tablet being about 80% by weight of the total penicillin, the amount of sulfonamide in the core tablet being about 16% by weight of the total sulfonamide and the sulfonamide in the core tablet constituting about 1.3 parts by weight of the total amount of penicillin in the core tablet, and the ammoniated polyvinyl acetate phthalate being about 8.0% by weight of the core tablet, the ammoniated polyvinyl acetate phthalate being characterized by a degree of polymerization of about 750, an acetyl content of about 4.8% and a phthalyl content of about 65%.

8. A penicillin-sulfonamide tablet consisting of a core tablet consisting of compressed granules of an acid-resistant penicillin, at least one substantially water-insoluble sulfonamide drug and ammoniated polyvinyl acetate phthalate, and a compressed concentric shell consisting essentially of a granular mixture of an acid-resistant penicillin and at least one water-insoluble sulfonamide drug, the amount of penicillin in the core tablet being about 75% by weight of the total penicillin, the amount of sulfonamide in the core tablet being about 14% by weight of the total sulfonamide and the sulfonamide in the core tablet constituting about 0.7 parts by weight of the total amount of penicillin in the core tablet, and the ammoniated polyvinyl acetate phthalate being about 9% by weight of the core tablet, the ammoniated polyvinyl acetate phthalate being characterized by a degree of polymerization of about 750, an acetyl content of about 4.8% and a phthalyl content of about 65%.

9. A penicillin-sulfonamide tablet consisting of a core tablet consisting of compressed granules of a water-soluble penicillin, at least one substantially water-insoluble sulfonamide drug and ammoniated polyvinyl acetate phthalate, and a compressed, concentric shell consisting essentially of a granular mixture of a water-soluble penicillin and at least one water-insoluble sulfonamide drug, the amount of penicillin in the core tablet being about 60% by weight of the total penicillin, the amount of sulfonamide in the core tablet being about 32% by weight of the total sulfonamide and the sulfonamide in the core tablet constituting about 4.5 parts by weight of the total amount of penicillin in the core tablet, and the ammoniated polyvinyl acetate phthalate being about 8% by weight of the core tablet, the ammoniated polyvinyl acetate phthalate being characterized by a degree of polymerization of about 750, an acetyl content of about 4.8% and a phthalyl content of about 65%.

10. A penicillin-sulfonamide tablet adapted to provide a therapeutic blood level of penicillin and sulfonamide for a period of about eight hours, consisting of a core consisting of compressed granules of a mixture of a penicillin salt, at least one substantially water-insoluble sulfonamide drug and ammoniated polyvinyl acetate phthalate, having a degree of polymerization of from 600–800, an acetyl content of from 4 to 15% and a phthalyl content of from 40 to 70%, the amount of penicillin salt in said core constituting from about 60 to about 95% by weight of the total penicillin in the finished tablet and the amount of sulfonamide drug constituting from about 10 to 35% by weight of the total sulfonamide in the finished tablet, said core being surrounded by a compressed layer of granules consisting of a mixture of 65 to 90% by weight of at least one substantially water-insoluble sulfonamide drug and of from 5 to 40% by weight of a penicillin salt.

11. A penicillin-sulfonamide tablet according to claim 10, wherein the sulfonamide in the core constitutes from 0.5 to 5 parts by weight of the amount of penicillin in the core tablet.

12. A penicillin-sulfonamide tablet according to claim 10, wherein the ammoniated polyvinyl acetate phthalate is from 5 to 20% by weight of the core tablet.

References Cited in the file of this patent

UNITED STATES PATENTS 2,099,402 Keller ---------------- Nov. 16, 1937
2,455,790 Malm ---------------- Dec. 7, 1948
2,727,473 Wolff ---------------- Dec. 20, 1955

OTHER REFERENCES

Charnicki: J.A.P.A., vol. 46, No. 8, August 1957, pp. 481–486.

D.T.N., Drug Trade News, Mfg. Section, June 7, 1954, p. 54.